Sept. 20, 1955  W. E. RANEY  2,718,376
CABLE PULLER
Filed March 25, 1953  4 Sheets-Sheet 1
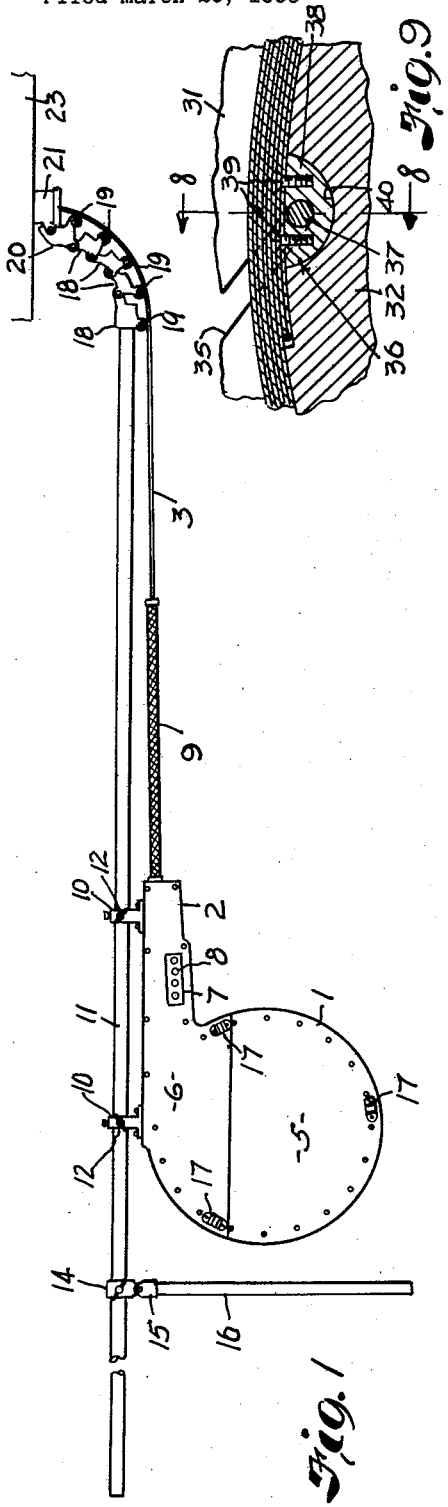
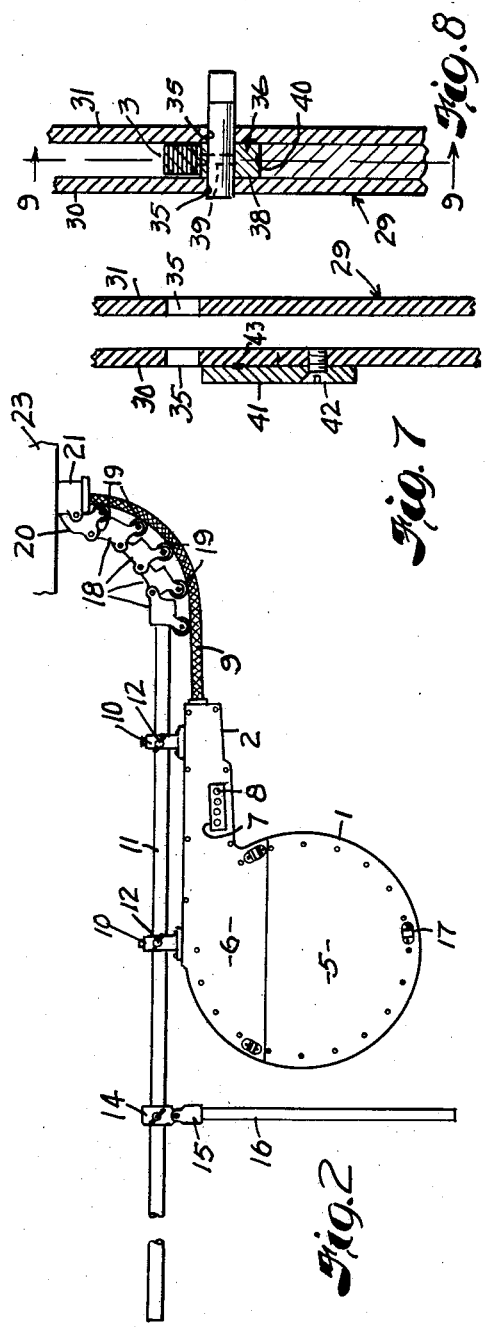
INVENTOR.
WILLIAM E. RANEY
BY
Oberlin & Limbach
ATTORNEYS.

Sept. 20, 1955 W. E. RANEY 2,718,376
CABLE PULLER
Filed March 25, 1953 4 Sheets-Sheet 2
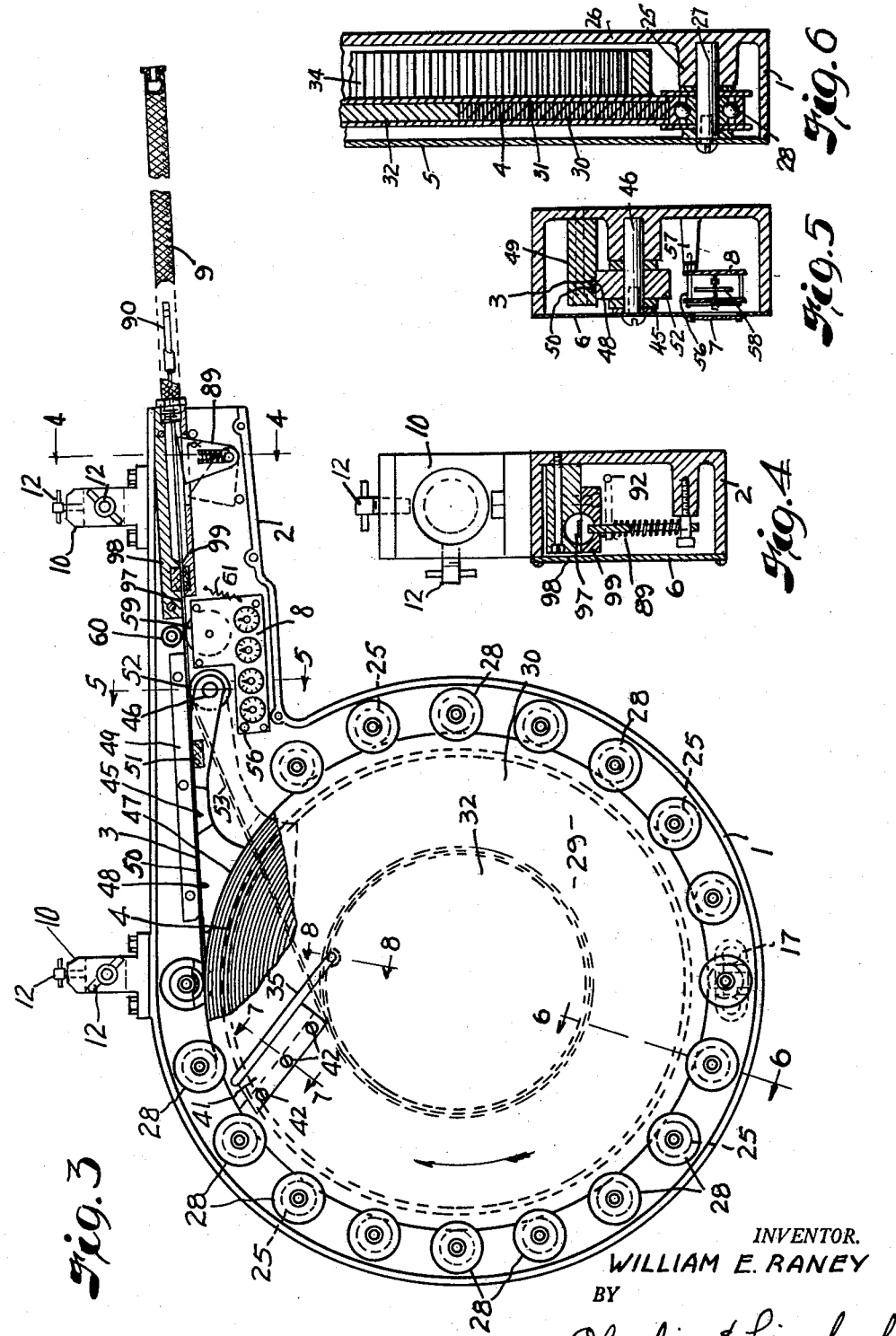
INVENTOR.
WILLIAM E. RANEY
BY
Oberlin & Limbach
ATTORNEYS.

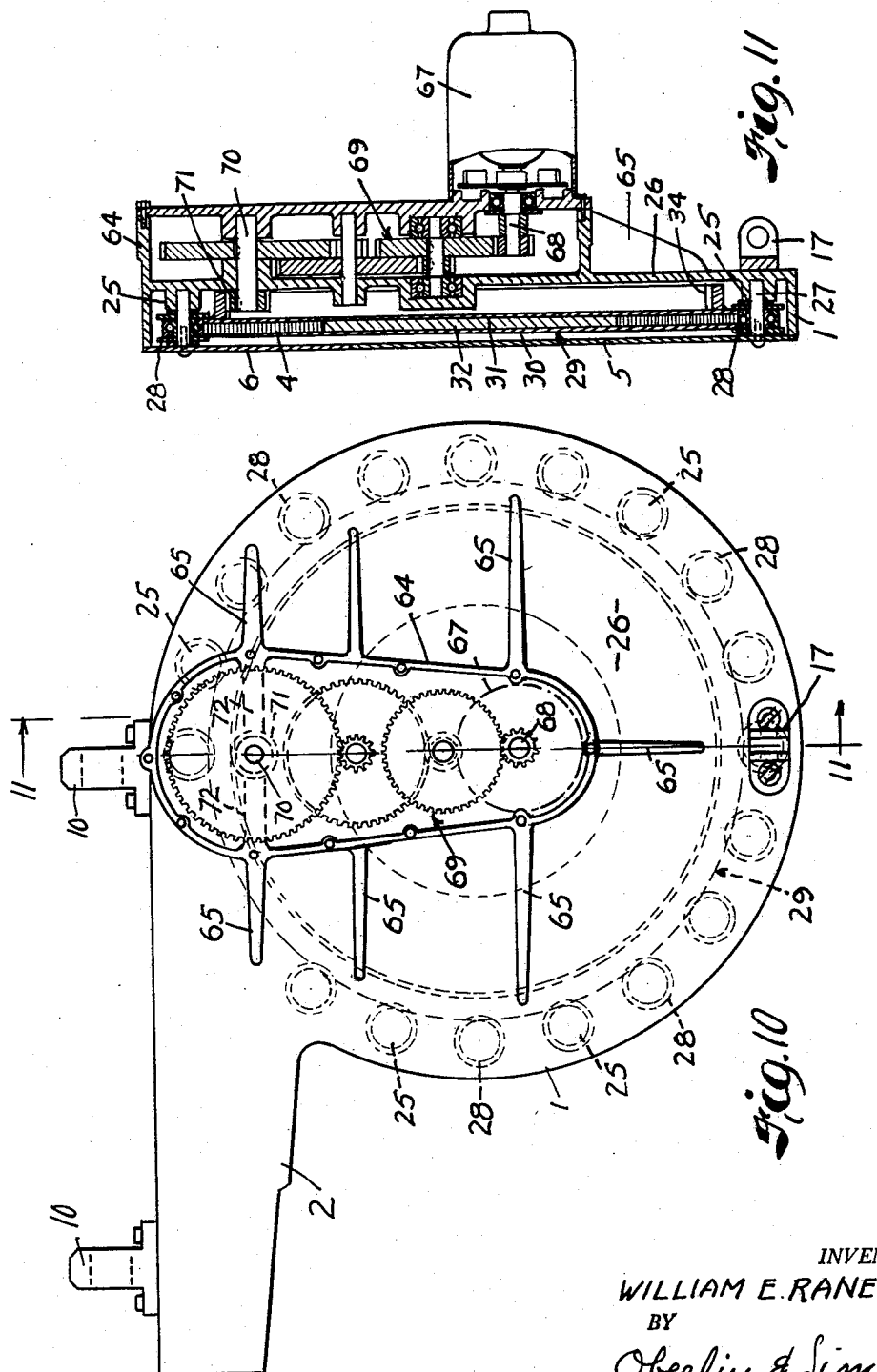

Sept. 20, 1955  W. E. RANEY  2,718,376
CABLE PULLER
Filed March 25, 1953  4 Sheets-Sheet 4
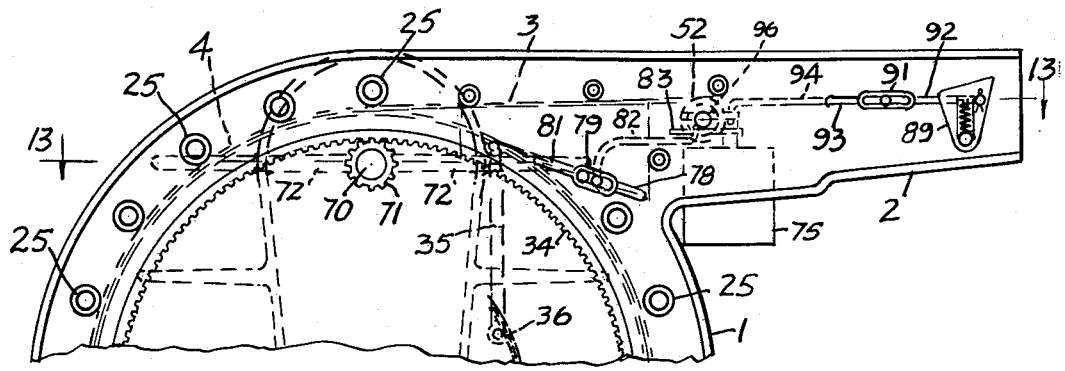
Fig. 12
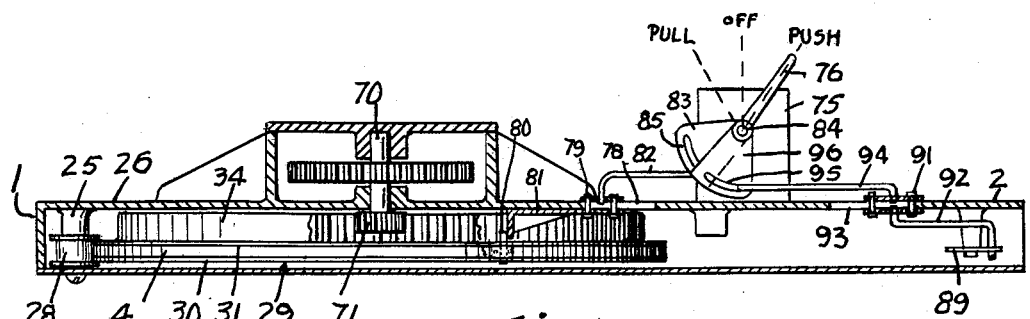
Fig. 13
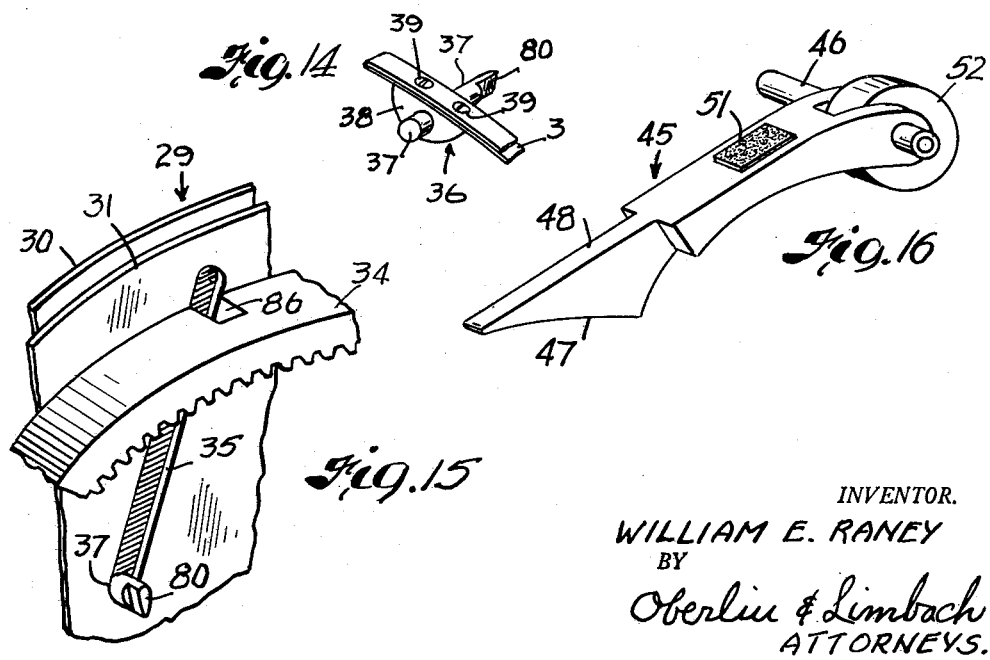
Fig. 14
Fig. 15
Fig. 16
INVENTOR.
WILLIAM E. RANEY
BY
Oberlin & Limbach
ATTORNEYS.

United States Patent Office 2,718,376
Patented Sept. 20, 1955

2,718,376

CABLE PULLER

William E. Raney, Rocky River, Ohio, assignor of one-fourth to C. M. Penney and one-fourth to Milan J. Siebert, both of Parma, Ohio Application March 25, 1953, Serial No. 344,509

29 Claims. (Cl. 254—134.3)

The present invention relates generally as indicated to a cable puller which is, as is the puller disclosed in my Patent No. 2,556,484, dated June 12, 1951, operative to unwind and to rewind a coil of fish tape (commonly referred to as a "snake") for paying out the tape through an electrical conduit from one end to the other or from one junction box to another and for pulling the tape through said conduit in the opposite direction together with an electrical cable or conductor secured to the connector or "bait" provided at the end of said tape.

Among the principal objects of this invention are the following:

1. To provide a cable puller which is designed to pay out the fish tape through a conduit without buckling even when substantial resistance is offered as in the case of long conduits or of conduits having various restrictions therein, such as bends, turns, elbows, etc.;

2. To provide a cable puller which is designed to exert heavy pulling forces on the tape to make possible the drawing in of relatively large cables and conductors into conduits, this being accomplished without causing any severe bending or permanent deformation of the tape;

3. To provide a cable puller which can be supported in such a position relative to a junction box or the like that the tape pay out is effected through either a straight or a smoothly curved embracing and guiding portion between the cable puller proper and the junction box which eliminates buckling of the tape and smoothly guides the tape into the end of a conduit even under conditions of severe endwise compressive stress thereon;

4. To provide a cable puller which can be supported in such a position relative to a junction box or the like that the tape when rewound thereinto passes over an exposed guide portion of straight or smoothly curved form whereby, as the "bait" is drawn close to the cable puller proper, a desired exposed length of cable or conductor has been drawn out for splicing or connection purposes;

5. To provide a cable puller which is power driven and which has control means effective to automatically arrest the tape feeding and pulling at the proper times and in such manner as to avoid severe shock loads on either the tape or on the power drive means;

6. To provide a cable puller which has a novel form of tape measuring means for accurately indicating the length of tape which has been payed out;

7. To provide a cable puller which has novel supporting means whereby the cable puller can be supported in any desired position relative to a junction box or the like;

8. To provide a cable puller wherein the tape pay out is stopped at a time such that, upon reversal of the direction of rotation of the tape reel, the tape is first wrapped several times around the hub of said reel to thereby materially reduce the stresses at the connection of the tape to the hub and to permit substantially no load starting of the power drive means; and 9. To provide a cable puller wherein the initial rotation of the reel in the pay out direction is under substantially no load so that the power drive means can accelerate to operating speed under substantially no load and, therefore, a low-starting torque drive means may be employed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view showing the cable puller in tape pulling position relative to a junction box for drawing an electrical cable or conductor into a conduit;

Fig. 2 is a side elevation view similar to Fig. 1 except showing the cable puller in tape pay out or feed position for paying out the tape into a conduit;

Fig. 3 is a side elevation view, partly in section, of the cable puller proper, the cover plates on the front side having been removed so as to more clearly illustrate the internal construction of the cable puller;

Figs. 4 to 9 are cross-section views taken substantially along the lines 4—4, 5—5, 6—6, 7—7, 8—8, respectively, of Fig. 3 and line 9—9, Fig. 8, the Fig. 8 section line 8—8 also being indicated in Fig. 9;

Fig. 10 is a side elevation view of the rear side of the cable puller proper to show the gear case with its cover plate removed;

Fig. 11 is a cross-section view diametrically through the cable puller taken substantially along the line 11—11, Fig. 10;

Fig. 12 is a fragmentary elevation view particularly showing the control mechanism for selectively paying out and pulling in the tape and for automatically stopping such opposite feeding and pulling movements of the tape, the reel and its bearings, the tape and its guides, and the tape measuring device having been omitted for sake of clarity;

Fig. 13 is a cross-section view taken substantially along the line 13—13, Fig. 12;

Fig. 14 is a perspective view of the driving pawl to which the inner end of the tape is connected;

Fig. 15 is a fragmentary perspective view of the slotted portion of the reel in which the driving pawl moves outwardly during tape pay out and inwardly during initial rotation of the reel in tape pull direction; and Fig. 16 is a perspective view of an anti-buckling device or lever which swings outwardly to provide a guide tangent to the tape coil to prevent buckling and bending of the tape during the pay out thereof and which swings inwardly to reduce the angle of bend of the tape as it is pulled in and to cause the tape to run over a roller disposed at the pivoted end of said lever.

*General construction of cable puller*

As best shown in Figs. 1, 2, 3, 10, and 11, the cable puller proper comprises a casing 1 of generally circular form having a tangential extension 2 through which the fish tape 3 travels in opposite directions during the unwinding and rewinding of the tape from a coil 4 contained in said casing. Secured on the front side of said casing 1 is a two-part cover plate comprising the parts 5 and 6, the latter of which is provided with a window 7 for a tape measuring device 8. To the end of said extension 2 is secured a flexible conduit 9 which is preferably in the form of a woven or braided wire sleeve through which the tape moves in opposite directions.

Cable puller supporting means

Secured on said extension 2 are spaced apart brackets 10 through which a support tube or bar 11 extends in a direction preferably parallel to extension 2, said tube being longitudinally adjustable in said brackets and held in any desired adjusted position as by means of the thumb screws 12 which are threaded into said brackets 10 and which bear against said tube 11. Longitudinally adjustably clamped to said tube 10 is a bracket 14 (see Figs. 1 and 2) which pivotally or rigidly carries a socket member 15 into which a piece of conduit 16 of desired length may be screwed or slipped into place and locked either by a set screw, bayonet attachment, etc., so as to constitute a prop for supporting the cable puller at a desired height from the floor or other supporting surface. The casing 1 is also provided with brackets 17 at circumferentially spaced points therearound to which similar socket members 15 may be pivotally or rigidly connected to support the cable puller on similar props or legs 16.

The end of said tube 11 (see Figs. 1 and 2) is screwed into or otherwise connected to the last one of a series of guide blocks 18 which preferably are pivotally connected to one another and provided with concavely curved rollers 19 over which the tape 3 and the end portion of the drawn cable or conductor run during the pull operation (see Fig. 1) and on which the flexible conduit 9 is supported when the tape is being payed out into a conduit (see Fig. 2). Any desired number of these blocks 18 may be provided and each has interengaging limit stop portions to determine the minimum radius on which the peripheries of rollers 19 lie. The first block 20 into which tube 11 may be screwed, in the event of a straight pull, is pivotally or otherwise secured to a fitting 21 which is adapted to be threaded onto the end of a conduit which extends into a junction box 23 or the like and said fitting 21 and first block 20 are provided with interengaging stop portions so that the periphery of its roller 19 will center the drawn conductor or cable or the flexible conduit 9 with respect to fitting 21 and the conduit to which said fitting is screwed. In Figs. 1 and 2, a series of five guide blocks equipped with rollers 19 is employed when the tube 11 and cable puller are disposed at an angle of about 90° to the conduit leading into the junction box 23 and, obviously, additional blocks 18 may be employed when the angle is greater and fewer blocks when the cable puller is more nearly in line with the fitting 21 and the conduit.

The tape coil and reel therefor

As best shown in Figs. 3 and 6, and also Figs. 10 to 13, the casing 1 has a series of circularly arranged bosses 25 projecting from the bottom wall 26 thereof, and a corresponding number of axles 27 have their ends anchored in said bosses 25 and in the cover plates 5 and 6. On said axles 27 are flanged rollers 28 in the form of anti-friction bearings.

The tape reel 29 is rotatably supported in said casing 1 by said rollers 28 with the flanges 30 and 31 thereof fitting into the grooves of said rollers so that said flanges are held against spreading apart. Said reel 29 is provided with a hub 32 and the rear flange 31 has welded or otherwise secured thereto a ring gear 34 through which said reel is driven in opposite directions in a manner as will be hereinafter explained in detail.

As shown in Figs. 3, 7, 8, 9, 12, and 15, the flanges 30 and 31 of said reel 29 are each formed with a slot 35 which is inclined so that (1) the driving pawl 36 which is slidably fitted into such slot and to which the inner end of tape 3 is connected, will exert, during the pay out operation, radial outward and tangential force components on the inner convolution of said tape 3; (2) the reaction through the inclined slots 35 will cause said driving pawl 36 to progressively move outwardly as said reel 29 is rotated in a direction to pay out the tape 3 from the outer convolution of the coil 4 thereof. The driving pawl 36 includes, as shown, opposite trunnions 37 a pin portion which are slidable in the respective slots 35 and a block portion 38 to which the thickened end of the fish tape 3 is secured as by means of screws 39 or equivalent means. The block portion 38 and tape end is complementary with the recess 40 formed in the periphery of hub 32 so that when reel 29 is rotated in direction, the driving pawl 36 and the tape end connected thereto will fit into such recess 40 and thereby provide a smooth cylindrical surface about which the tape 3 is coiled. This position of the driving pawl 36 is shown in Fig. 9 and also in Fig. 8. The driving pawl 36 is shown in perspective in Fig. 14.

In order to facilitate replacement of the tape 3, the slot 35 in the top flange 30 of the reel 29 is laterally enlarged and a plate 41 is detachably secured to said reel flange as by means of screws 42. Said plate 41, when removed, will enable withdrawal of the driving pawl 36 and the tape connected thereto through the enlarged portion of the slot 35 whereby the tape end may be disconnected and pulled through extension 2 and a new tape substituted therefor be inserted through extension 2 and through the enlarged slot portion. The piece 43 of the enlarged slot portion is welded or brazed to said plate 41 as shown in Fig. 7. The making of the casing cover plate in two parts 5 and 6 facilitates replacement of the tape 3 in that only the cover part 6 need be removed to provide access to plate 41 and driving pawl 36 as aforesaid.

As is now apparent, when the reel 29 is driven in a clockwise direction, as viewed in Fig. 3, for example, the coil 4 of the fish tape 3 will be expanded by radial outward and tangential force applied on the inner end or innermost convolution by cooperation of pawl 36 and slots 35 so that the outermost convolution will engage the rollers 28 and, thus, the coil 4 will rotate freely to unwind the tape therefrom. The tape 3 in so being fed or payed out will travel through extension 2 and flexible conduit 9 in a manner as hereinafter explained.

Anti-buckling device

This device, as shown in Fig. 3 and Fig. 16, comprises an arm or lever 45 which is pivotally secured by pin 46 at a point disposed well into the extension 2 of casing 1 and which has an inner arcuate finger portion 47, said portion 47 being engaged by the outermost convolution of the tape coil 4 and thereby said arm is swung outwardly to the solid line position, as shown in Fig. 3. Said portion 47 provides a tape confining wall between adjacent rollers 28 and the upper straight portion 48 of said arm 45 cooperates with a guide bar 49 secured in extension 2 to form a straight slot 50 through which the tape 3 is payed out. The tip of said arm 45 extends, in its solid line position of Fig. 3, almost to the point of coil 4 where the straight length of tape 3 is tangent to the outermost convolution of the coil, and thus, there is no opportunity for buckling of said tape 3. The coil 4 tape is embraced against buckling by the rollers 28 and the unwound tape 3 is similarly embraced by the guide slot 50 provided by said bar 49 and the mating portion 48 of such anti-buckling device. Although there is generally not any appreciable friction of the tape 3 against the arcuate face of portion 47, it may be desirable in some instances to have an anti-friction material on said arcuate face or to provide one or more small rollers thereon. It will be appreciated that in order to create any appreciable pressure between the tape 3 and said arcuate face, the coil 4 of tape would have to bulge out between the adjacent rollers 28; and, as apparent, the rollers are reasonably close to one another so as to preclude any such bulging, especially when several convolutions of the tape coil 4 are yet left in the puller. Said arm 45 is also provided with a felt or like pad 51 which wipes the tape 3 as the same is being pulled and rewound onto reel 29.

When said reel 29 is rotated in a counter-clockwise direction, as viewed in Fig. 3, the driving pawl 36 will immediately move toward its recessed position in the hub 32 whereupon the tape 3 will be pulled over the roller 52 which is journalled on pin 46 to the hub 32 along the path indicated by the dotted lines in Fig. 3, and when so pulled, the anti-buckling device or arm 45 will be swung to the dotted line position and the finger portion 47 of said arm will guide the tape 3 into the space between the flanges 30 and 31 of said reel 29. The tape 3, in so being pulled, runs over the relatively large diameter roller 52 which is spaced sufficiently far from the reel 29 that the tape is only slightly bent even when the reel is empty; the maximum angle of bend being indicated by the reference numeral 53. Of course, as the pulling progresses, the diameter of the coil 4 of tape will progressively increase and the arm 45 will be progressively swung outwardly toward the solid line position which it assumes when the reel 29 is full. The angle of bend 53 therefore approaches zero as the tension in the tape 3 increases owing to pulling of increasing length of cable or conductor into a conduit.

*Tape measuring device*

The tape measuring device 8 previously referred to is, as best shown in Figs. 3 and 5, pivotally secured by pivot screw 56 to a boss 57 in said extension 2 and has therein a conventional gear train 58 and dials as on gas and electric meters which respectively indicate from left to right the length of tape in hundreds of feet, tens of feet, feet, and tenths of a foot. Said device 8 has thereon a measuring roller 59 which drives the dial gearing 58 and which frictionally engages one side of the tape 3 adjacent the guide bar 49 and the pivot 46 and a back-up roller 60 is provided on the opposite side of the tape 3. A spring 61 swings the measuring device about the pivot 56 to yieldably press the roller 59 against the tape.

*Cable puller power drive means*

The casing 1 of the cable puller is provided, as best shown in Figs. 10 and 11, with a gear case 64 having suitable reinforcing webs 65 extending from its peripheral rim to the back wall 26 of said casing. Secured to said gear case 64 adjacent one end thereof in laterally projecting relation is a drive motor 67, the drive shaft of which is coupled to the input shaft 68 of a reduction gear train 69. The output shaft 70 has a pinion 71 in mesh with the ring gear 34 of the reel 29. Said drive motor 67 is preferably of the reversible type so that the reel 29 may be selectively driven in opposite directions, by simple electric motor switching means rather than by elaborate reverse gearing, clutches, and the like. Obviously, power drive means other than an electric motor 67 may be employed.

In view of the large gear reduction (12,000 to 5 R. P. M. for example), and the tremendous forces which therefore are transmitted by the drive pinion 71 to ring gear 34, extra reinforcing 72 is provided thereat so as to prevent distortion of the gear case 64.

The drive means herein employed may employ a relatively small size high speed reversible electric motor 67 and by reason of the large gear reduction of the gear train 69, tremendous pay out and pull forces may be applied on the tape 3.

*Switch control mechanism to automatically stop reel rotation in opposite directions*

The motor control mechanism is most clearly shown in Figs. 12 and 13 as comprising a three-position switch 75, the manually actuated handle 76 of which may be turned from an intermediate "Off" position to either the "Push" or "Pull" position to control the direction of operation of the electric drive motor 67 to drive the reel 29 in a clock-wise direction or in a counter-clockwise direction, as viewed in Fig. 12, for example.

The back wall 26 of the casing 1 is formed with a slot 78 in which a switch operating link slide 79 is reciprocable along a path which is preferably, but not necessarily, generally tangent to the circular or spiral path of the driving pawl 36. The end 80 of the driving pawl trunnion 37 which projects from the rear flange 31 of the reel 29 is provided with a relatively sharp corner, as shown, which is adapted to engage the bent end of a link 81 connected to slide 79 when said pawl 36 and its end 80 has moved to a predetermined maximum radial position in reel slot 35. This position is preferably such that the driving pawl end 80 will engage the bent end of said link 81 when there are at least two full convolutions of the tape 3 left. At that time, the rotation of the reel 29 and the corresponding generally circular movement of the driving pawl 36 will cause the link 81 and slide 79 to be moved in the direction of slot 78 and because these paths diverge, the pawl will subsequently disengage from the link 81 and move therepast. Connected to said slide 79 in a ball and socket joint or swivel joint is one end of another link 82 which has its other end pivotally secured to a segment 83 which is keyed to the switch operating shaft 84. Thus, the movement of the first link 81, as aforesaid, will through said slide 79 and said second link 82 actuate the switch 75 to the intermediate "Off" position. The segment 83 is provided with an arcuate slot 85 in which the bent end of link 82 is pivotally fitted to provide a lost-motion connection so that the switch handle 76 may be manually actuated to the "Pull" position while the linkage 81, 79, and 82 is in the "Off" position insofar as "Push" is concerned.

In the event that the driving pawl 36 just misses the bent end of first link 81 or only radially overlaps the same, an insufficient amount to turn said switch shaft 84 to intermediate "Off" position, said driving pawl, in moving outward one thickness of tape 3 during the next revolution of reel 29, will overlap enough to shift link 81 and then pass the latter. Even then, at least one full convolution of tape 3 will remain. It is to be noted that the ring gear 34, as best shown in Fig. 15, is provided with a slot 86 through which the driving pawl trunnion 37 may pass so that the projecting end 80 thereof may contact said first link 81.

With respect to the "Pull" control, the extension 2 adjacent its end has a pivoted dog 89 therein which, when the bait 90 at the end of the tape 3 has moved to the right therepast, is actuated from the dotted line position to the solid line position shown in Fig. 3 and in Fig. 12. In this position, the link slide 91 (and its link 92 which is pivotally connected to said dog 89) is in its rightward position in the slot 93 in extension 2 and the link 94, which is swivelly connected at one end to said slide 91 and at the other end in the arcuate slot 95 of a segment 96, is in a position permitting the switch handle 76 to be turned from "Off" to "Pull."

Assuming now that the switch handle 76 is in the "Pull" position and that the lost-motion connection of link 94 and segment 96 is taken up, and that the reel 29 is turning in a counter-clockwise direction, as viewed in Figs. 3 and 12, as the bait 90 engages the forward edge of the pivoted dog 89, the latter will be swung counter-clockwise and the consequent movement linkage 92, 91, and 94 will turn the switch operating shaft 84 to its intermediate "Off" position. When this has been done, the electric drive motor 67 will be de-energized and the reel 29 may coast a part turn before the bait 90 engages the end of the tape guide slit 97 in the complementary bars 98 and 99 (see Figs. 3 and 4).

When the switch 75 is actuated to the "Pull" position, the one or two or more convolutions of the tape 3 which remains in the tape coil 4 at the end of the pay out or "Push" operation will permit the reel 29 to make several revolutions in a counter-clockwise direction before actually exerting any appreciable tensile stress on the tape 3. Thus, the motor 67 is allowed to accelerate to operating speed under substantially no load, and when the tape 3 is actually being pulled in under high stress, the several wraps thereof around the hub 32 will preclude the transmission of the high tensile strains to the connection between the tape end to the driving pawl 36.

Cable puller operation

Having thus described the construction of a preferred form of my cable puller, the operation thereof will now be briefly described.

PAY OUT OF FISH TAPE

When it is desired to force the tape 3 into and through a conduit, the cable puller is first mounted in a convenient position with respect to the conduit into which the tape is to be fed; and for such purpose, struts 16 of appropriate length are mounted on one or more of the brackets 14 or 17 and the tube 11 is adjusted lengthwise in the brackets 10. A chain of pivotally connected blocks 18 and 20 are connected at opposite ends to tube 11 and to fitting 21 at the junction box 23 so that the flexible conduit 9 will enter the fitting 21, as shown in Fig. 2. As previously indicated, the number of blocks 18 which need be used depends upon the desired position of the cable puller relative to the junction box 23. In some instances, the junction box 23 is in the ceiling or near the ceiling of a room; and in other instances, it is in the floor or in a side wall adjacent the floor. Therefore, the cable puller will have to be supported at different heights and positions near enough to said junction box to enable positioning of the flexible conduit 9 in the fitting 21.

When the cable puller has been properly positioned, as aforesaid, the operator can now turn the motor control switch handle 76 to the "Push" position. The motor 67 thus rotates the reel 29 within casing 1 in a clockwise direction as viewed in Fig. 2, whereupon, first, the fish tape coil 4 is expanded until the outer convolution engages the rollers 28 and the succeeding convolutions are packed together. This expansion of tape coil 4 and packing of the convolutions permits starting of motor 67 under no load. Now, as the fish tape 3 begins to move, the bait 90 at the end thereof moves past the dog 89. As the tape 3 is thus payed out, the measuring device 8 indicates the precise number of feet which have been thus payed out.

When the desired number of feet has been payed out, the operator manually turns the switch handle 76 to "Off" position. In the event that nearly the entire length of the tape 3 is to be payed out, the actuation of the switch 75 to "Off" position is automatically accomplished by engagement of the driving pawl 36 with the switch actuating link mechanism 81–79–82, whereupon as said pawl moves in engagement with the first link 81, said link mechanism turns the switch actuating shaft 84 through the segment 83 to the "Off" position. As previously mentioned, in this "Off" position, there are preferably at least two convolutions of the tape left. Of course, the disengagement of the driving pawl 36 from the link 81 permits the reel 29 to coast to a stop; and even if such disengagement occurs before the switch 75 has been actuated to "Off" position, the driving pawl 36, will do so the next time it engages link 81; and even then, at least one full convolution of tape 3 remains in the reel 29.

With the tape thus pushed through the conduit, the end of a cable or conductor may be looped through the bait 90 and twisted preparatory to the pulling of the tape 3 through the conduit, together with the cable or conductor connected thereto, in the opposite direction.

PULL IN OF TAPE AND CABLE OR CONDUCTOR CONNECTED THERETO

When the cable puller is to be used in the "Pull" position, it is supported as shown in Fig. 1, for example, with the tube 11 adjusted so that the end of the flexible conduit 9 is spaced a desired distance from the fitting 21 to permit pulling of an extra exposed length of cable or conductor for splicing and connection purposes.

In order to start the "Pull" operation, the operator turns the switch handle 76 to the "Pull" position whereupon the reel 29 is driven in a counter-clockwise direction as viewed in Fig. 1. The first few revolutions of the reel 29 will effect wrapping of several turns of the fish tape 3 around the hub 32 of the reel to eliminate stress on the tape-driving pawl connection and to permit no load starting of the electric drive motor 67. Thereafter, as the reel 29 is driven in a counter-clockwise direction, the tape 3 is rewound and thus pulled through the conduit together with the cable or conductor which is connected thereto. As the cable or conductor emerges from the end of the conduit and from the fitting 21, the operator may manually actuate the switch 75 to the "Off" position when a desired length of cable or conductor so extends beyond the end of the conduit. In the event that the operator so desires, or in the event that he forgets to operate switch 75, the same will be accomplished automatically when the bait 90 trips the pivoted dog 89 at which time the switch will be actuated to "Off" position through the linkage 92–91–94 and segment 96 of the switch turning shaft 84. As before, the reel 29 may coast to a stop before the bait 90 reaches the end of the guide slit 97 in the complementary bars 98 and 99. Moreover, the inertia of the reel 29 is not sufficient to cause objectionable shock even when no cable is being drawn through a conduit. In any event, the final operation is the disconnection of the cable or conductor from the bait 90 whereupon the cable puller may again be adjusted adjacent a junction box 23 or the like for paying out the tape into a conduit.

Other modes of applying the principle of the invention may be employed, change being made as regards the details described, provided the features stated in any of the following claims, or the equivalent of such, be employed.

I therefore particularly point out and distinctly claim as my invention:

1. In combination, a spool having fish tape spirally coiled therearound, a casing journalling said spool and rotatably embracing the outer convolution of the tape, said casing being formed with a passage through which the tape is adapted to be payed out and to be pulled in, said spool having a radially movable drive member connected to the inner end portion of the tape for rotating the coil of tape to pay out the tape as aforesaid responsive to rotation of said spool in one direction, means for interrupting the rotation of said spool in such one direction to leave a coiled length of tape in said casing such that, upon rotation of said spool in the opposite direction, at least a full convolution of tape will be wound around said spool prior to effecting a pulling in of the tape, and means for rotating said spool in opposite directions.

2. The combination of claim 1 wherein said means for rotating said spool comprises a reversible drive motor operatively connected to said spool, and said means for interrupting the rotation of said spool comprises a motor control mechanism arranged to be actuated by said drive member to render said motor inoperative to further rotate said spool in such one direction.

3. The combination of claim 2 wherein said motor comprises an electric motor, and said motor control mechanism comprises a switch, which when actuated by said drive member, de-energizes said electric motor.

4. The combination of claim 3 wherein said switch includes a movable member which is engaged and moved by said drive member and past which said drive member is adapted to move whereby said spool will coast to a stop after de-energization of said electric motor.

5. The combination of claim 4 wherein said drive member and movable member are radially overlapped when the latter is being moved, the paths of movement of said members being divergent whereby said drive member radially clears said movable member to move therepast as aforesaid.

6. In combination, a spool having fish tape spirally coiled therearound, a casing journalling said spool and rotatably embracing the outer convolution of the tape, said casing being formed with a passage through which the tape is adapted to be payed out responsive to rotation of said spool in one direction, said spool being formed with a generally radially extending slot alongside the coil of tape, and a drive member slidable in said slot and connected to the inner end portion of the tape for rotating the coil of tape to pay out the tape as aforesaid.

7. The combination of claim 6 wherein such slot is non-radial to exert, through said drive member, tangential and radial force components on the inner end portion of the coil of tape to rotate the latter in said casing and to progressively expand the inner and successive surrounding convolutions of the coil of tape so as to maintain the outer convolution in rotatably embraced relation by said casing.

8. The combination of claim 6 wherein such slot is non-radial so that said drive member is moved outwardly and inwardly therealong responsive to exertion of compressive and tensile forces on the inner end portion of said tape when said spool is rotated in such one direction and then in the opposite direction.

9. The combination of claim 8 wherein said spool has a pair of flanges which laterally embrace the coil of tape therebetween and which are formed with such slot therethrough, and said drive member has end portions slidable in such slot and an intermediate portion to which the inner end portion of the tape is secured.

10. The combination of claim 9 wherein the slot in one of said flanges is formed for insertion and withdrawal of said drive member, and a removable cover plate is provided on said one flange to retain said drive member in said spool.

11. In combination, a spirally coiled fish tape, a casing rotatably embracing said coil of tape and having an extension through which the tape from the outer convolution is adapted to be payed out and pulled in, a drive member journalled in said casing and connected to the inner end portion of said coil for rotating the latter to pay out the tape as aforesaid and for coiling the tape therearound to pull in the tape, an anti-buckling device in said casing defining with said extension a passage for supporting the tape against buckling as it is payed out from the outer convolution of said coil, said device being supported in said casing for inward movement of its passage-defining surface to reduce the bend of the tape as it is rewound and pulled in through said extension.

12. The combination of claim 11 wherein said device is in the form of an arm which is pivotally connected at one end to said extension and has its other end swung by the tape to positions generally tangent the outer convolution of said coil during pay out and pull in of the tape.

13. The combination of claim 12 wherein such other end of said arm is engaged by the outer convolution of said coil during rotation of said drive member in pay out direction, and thus is held in a position preventing buckling of the tape and is engaged by the tape in such passage during rotation of said drive member in the opposite direction and thereby swung about its one end so that the tape, when rewound, runs over such one end of said arm.

14. The combination of claim 13 wherein the pivoted end of said arm is provided with a roller over which the tape runs during pay out and pull in thereof.

15. The combination of claim 13 wherein the passage-defining surfaces of said extension and said arm extend generally tangentially from the outer convolution of said coil, and said arm is provided with an arcuate inner surface engaged by the outer convolution of said coil during rotation of said drive member in pay out direction.

16. In combination, a device having a flexible conduit through which fish tape is adapted to be payed out from and pulled into said device, and means supporting said device in a first position whereat said flexible conduit enters the conduit into which said tape is to be payed out and in a second position whereat the end of said flexible conduit is spaced from such conduit through which the payed out tape is to be pulled, together with an electrical conductor adapted to be fastened to the end of said tape, said means including a jointed series of blocks over which said flexible conduit is guided when said device is supported in the first position and over which said tape and conductor are guided when said device is supported in the second position.

17. The combination of claim 16 wherein said blocks are pivotally connected together and are provided with interengaging stops to determine the minimum radius of the guiding surfaces thereof.

18. The combination of claim 16 wherein an elongated member is longitudinally adjustably secured to said device, the block at one end of said series of blocks is connected to said elongated member, and the block at the other end of said series of blocks is adapted to be secured to the end of such conduit through which the tape is adapted to be fed and pulled.

19. The combination of claim 16 wherein said blocks are provided with rollers over which the tape runs when said device is supported in the second position.

20. The combination of claim 19 wherein said rollers are concavely curved to reduce flattening of electrical conductors pulled thereover.

21. In combination, a device for pulling fish tape through a conduit together with an electrical conductor adapted to be secured to the end of said tape, a drive motor for pulling said tape into said device, said tape having an enlarged end portion, and a motor control mechanism actuated by said enlarged end portion of said tape to interrupt pulling in of said tape.

22. The combination of claim 21 wherein said drive motor is an electric motor and said mechanism includes a switch which, when actuated by said enlarged end portion, de-energizes said motor.

23. The combination of claim 22 wherein said enlarged end portion and mechanism have diverging paths of movement whereby said portion may coast past said mechanism.

24. The combination of claim 23 wherein said mechanism includes a pivoted switch actuator.

25. The combination of claim 24 wherein spring means bears on said actuator whereby said enlarged end portion may swing said actuator in the opposite direction and move therepast when said tape is moved in the opposite direction.

26. In combination, a spirally coiled fish tape, a casing having a series of circularly arranged rollers therein for rotatably embracing the outer convolution of said tape and having a passage between adjacent rollers through which said tape is adapted to be payed out, a spool journalled in said casing having a hub around which said tape is adapted to be coiled, a drive member carried by said spool for rotation therewith and for outward and inward movement relative to said hub, said drive member being connected to the inner end portion of said tape and thus being operative, upon rotation of said spool, to rotate said coil of tape in said casing and to progressively enlarge the inner and successive convolutions thereof as said tape is payed out through such passage from the outer convolution thereof, reversible drive means for driving said spool in opposite directions, a control for said drive means operative to interrupt pay out of said tape when at least the inner end portion of said tape constitutes a portion of the outer convolution, whereby upon reversal of said drive means said drive means moves inwardly toward said hub and at least one full convolution of tape is wound onto said hub prior to the payed out tape being pulled and thus wound around said hub, said control being further operative to interrupt pulling in of said tape while at least a portion thereof remains in such passage and before the diameter of said coil grows to contact said rollers whereby, during the initial rotation of said spool in the tape pay out direction, the inner and successive convolutions are expanded under substantially no load before the tape is payed out from the outer convolution.

27. The combination of claim 26 wherein said drive means comprises an electric drive motor, and said control includes a motor control switch which when actuated de-energizes said motor, and an actuator therefor which is in the path of said drive member and of the outer end portion of said tape to be engaged thereby.

28. The combination of claim 27 wherein the paths of movement of said actuator and of said drive member and outer end portion of said tape are divergent whereby said drive member and outer end portion of said tape first engages and moves said actuator to motor de-energizing position and then moves past said actuator whereby said spool coasts to a stop.

29. The combination of claim 28 wherein said actuator has a lost motion connection with said switch whereby said switch may be manually actuated to de-energize said motor and to control the direction of operation thereof.

References Cited in the file of this patent

UNITED STATES PATENTS

| | | |
|---|---|---|
| 2,556,484 | Raney | June 12, 1951 |
| 2,612,698 | Bodle | Oct. 7, 1952 |